3,025,225
ELECTROLYTIC ACID DESCALING OF METALS

Herman Ben Snyder and Richard B. Kaylor, Seattle, Wash., assignors to Boeing Airplane Company, Seattle, Wash., a corporation of Delaware
No Drawing. Filed Oct. 5, 1959, Ser. No. 844,219
5 Claims. (Cl. 204—145)

This invention relates to removing scale from heat treated metal members, and more particularly, to removing scale from heat treated metal members by means of an electrolytic process using an acid aqueous bath.

When metals are heated during their preparation or forming cycles, a so-called "scale" forms on the surface of the metal which is frequently difficult to remove. This scale, particularly when the metal is heated in air or in oxygen, usually includes oxides of the metal which is being treated. The scale formed on many metals such as stainless steels, so-called "super alloys," titanium alloys, etc., is very difficult to remove, and frequently requires the use of mechanical methods such as sandblasting. "Super alloys" is a generic term describing high strength heat and corrosion resistant materials such as those set forth in Table II below. They generally contain iron, nickel, cobalt, or chromium, singly or in combination, as the basis of their composition, but they normally contain one or more elements such as molybdenum, tungsten, columbium, titanium and aluminum for the express purpose of providing increased strength.

Our invention relates to the removal of this scale from metals by the use of electrolytic descaling processes utilizing an acid aqueous bath as set forth below.

Therefore, it is an object of this invention to provide an improved bath for descaling heat treated metal members.

It is another object to provide an improved bath for removing scale from heat treated metal members by an electrochemical process.

It is a further object to provide an improved method of removing scale from heat treated metal members.

It is still another object to provide an improved method of removing scale from heat treated metal members by an electrochemical process.

These and other objects of this invention will be apparent from the following description.

We have discovered that certain metals, including austenitic stainless steels, precipitation heardening stainless steels, titanium alloys, "super alloys," etc., may be readily descaled by a process uitlizing a solution including the following ions, all of which are necessary except the phosphate ion as mentioned below: hydrogen ion, sulfate ion, fluoride ion, sulfite ion, and phosphate ion. The limits of the concentrations of the above ions should be those corresponding to the ion concentrations obtained in a solution having the limits set forth in Table I.

Table I

| | |
|---|---|
| Sulfuric acid ($H_2SO_4$) (100%) | 60%–95% volume. |
| Hydrofluoric acid (HF) (70%) | 0.5%–20% by volume. |
| Sulfite ion ($SO_3$)= | 0.001% by weight to saturation. |
| Orothophosphoric acid ($H_3PO_4$) (85%) | 0%–0.5% by volume. |
| Water | Balance. |

Our invention should not be limited to the particular materials or the particular strengths (such as 70% hydrofluoric acid) set forth in Table I as those materials are merely regarded as being suitable for supplying the above mentioned ions.

In this specification and in the claims the term "phosphate ion" includes all phosphorus-containing ions which are present upon the ionization of orthophosphoric acid.

While we do not wish to limit our invention by possible theories and mechanisms, it is our belief that this solution operates in the following manner. The electric current provides a driving force for ion movement and forces ions into the scale where there is a chemical reaction between the hydrogen ion (supplied by the sulfuric acid and partly by the hydrofluoric acid) and the scale. This chemical reaction allows the fluoride ion (furnished by the hydrofluoric acid) to penetrate the scale and come in contact with the metal surface where a reaction occurs to form a surface complex with the metal. The sulfite ion reacts with metal fluoride complex to form a metal fluoride sulfite complex, which has great bulk and which therefore forces the scale away from the surface of the metal. While the metal fluoride complex would have somewhat the same effect, the metal fluoride sulfite complex has greater bulk, thereby producing greater forces on the scale; also the metal fluoride sulfite complex is more water soluble and has lower adhesive properties. In addition, when the scale has been removed, the metal fluoride sulfite complex increases the electrical resistivity to a point where the impressed voltage is not capable of moving fresh fluoride ions into contact with the metal. At this point, almost all activity ceases, and the current is reduced automatically.

It should be noted that the formation of the metal fluoride sulfite complex occurs even when there is no scale on the surface. However, the bulk of this complex is so large that action ceases very quickly without removing any measurable amounts of metal.

As well as furnishing hydrogen ion, the sulfuric acid is a strong acid capable of releasing another acid from its salt. The sulfuric acid also acts as a scale conditioner (which permits the fluoride ion to penetrate the scale) and acts as an ion suppressor to keep current densities from becoming large. In addition, the sulfuric acid is capable of passivating (rendering the surface comparatively inert and causing resistance after descaling), polarizing, etc.

Water is required to permit controlled ionization of chemical compounds such as $H_2SO_4 \rightarrow H^+ + HSO_4^-$, $HSO_4^- \rightarrow H^+ + SO_4^=$, $HF \rightarrow H^+ + F^-$, $2HF \rightarrow H^+ + HF_2^-$.

In addition to providing the driving forces for ion movement, the electricity provides the necessary energy to force chemical interaction and, after loosening of the surface scale, polarizes the surface to limit further chemical reaction.

The orthophosphoric acid is not absolutely required for most good descaling (an exception being the B120VCA titanium alloy). However, the use of orthophosphoric acid results in a brighter surface. The orthophosphoric acid tends to make the complex conductive, which tends to prevent the current density from dropping. For this reason, it is necessary to keep the concentration of the orthophosphoric acid less than 0.5% by volume, or considerable metal will be removed from the surface (0.01% is considered a good working concentration). The use of the phosphate permits longer operation upon a surface thus enabling the removal of some of the more subborn scales in one cycle.

In Table II there is set forth a list of some metals which have actually been descaled by our process. It should be noted that this list includes austenitic stainless steels, precipitation hardening steels, titanium alloys, super alloys, etc.

Table II

| | C | Mn | Si | Cr | Ni | Al | Mo | P | S | Fe | Ti | V | H | N | Cu |
|---|---|---|---|---|---|---|---|---|---|---|---|---|---|---|---|
| Austenitic Stainless Steels: | | | | | | | | | | | | | | | |
| SAE 321 | 0.08 Max. | 2.00 Max. | 1.00 Max. | 17.0–19.0 | 8.00–11.00 | | | 0.03 | 0.03 | Bal. | (Ti min 5 times C) | | | | |
| SAE 347 | 0.08 Max. | 2.00 Max. | 1.00 Max. | 17.0–19.0 | 9–13 | | | 0.03 | 0.03 | Bal. | (Cb min 10 times C) | | | | |
| Precipitation Hardenable Stainless Steels: | | | | | | | | | | | | | | | |
| 17-7 PH | 0.07 Max. | 0.60 Max. | 0.40 Max. | 17.0 | 7.0 | 1.15 | | | | Bal. | | | | | |
| PH 15-7 Mo | 0.07 Max. | 0.60 Max. | 0.40 Max. | 15.0 | 7.0 | 1.15 | 2.25 | | | Bal. | | | | | |
| | | | | | | | | | N | | | | | | |
| AM 350 | 0.10 | 0.90 | 0.40 | 17.0 | 4.0 | | 2.75 | | 0.10 | Bal. | | | | | |
| AM 355 | 0.13 | 0.95 | 0.50 | 15.0 | 4.0 | | | | 0.10 | Bal. | | | | | |
| A 286 | 0.08 Max. | 1.0–2.0 | 0.4–1.0 | 13.5–16.0 | 24.0–27.0 | 0.35 Max. | 1.0–1.5 | 0.04 | 0.03 | Bal. | 1.75–2.25 | 0.1–0.5 | | | |
| Titanium Alloys: | | | | | | | | | | | | | | | |
| 6 A1-4V | 0.1 Max. | | | | | 5.5–6.75 | | | | 0.3 Max. | Bal. | 3.5–4.5 | 0.02 Max. | 0.07 Max. | |
| B120VCA | 0.1 Max. | | | 10.0–12.0 | | 2.0–2.4 | | | | 0.5 Max. | Bal. | 12.0–15.0 | 0.015 Max. | 0.07 Max. | |
| | | | | | | | | Co | Cb | | | W | Cb+Ta | | |
| Super Alloys: | | | | | | | | | | | | | | | |
| M252 | 0.10–0.20 | 0.5–1.5 | 0.3–1.0 | 18–20 | Bal. | 0.5–1.25 | 9–11 | 9–11 | | 5.0 Max. | 2.25–2.75 | | | | |
| N155 | 0.08–0.16 | 1.–2 | 1 Max. | 20–22.5 | 19–21 | | 2.5–3.5 | 18.5–21 | | Bal. | | 2–3 | 0.75–1.25 | 0.1–0.2 | 0.5 Max. |
| Haynes 25 | 0.05–0.15 | 1–2 | 1 Max. | 19–21 | 9–11 | | | Bal. | | 3 Max. | | 14–16 | | | |
| Inconel X | 0.04 | 0.5 | 0.4 | 15 | Bal. | 0.7 | | | 1.0 | | 7.0 | 2.5 | | | |

We made many tests and experiments on the above metals and finally determined the concentration limits as set forth above in Table I.

Our invention may be performed in one particular embodiment as follows. A part made of SAE 321 austenitic stainless steel is first degreased by methods such as vapor degreasing or other satisfactory methods to remove oils, grease and other surface contaminants. The part is then rinsed thoroughly and is immersed in an acid aqueous bath which, in this particular example, is of the following composition.

Table III

| | |
|---|---|
| Sulfuric acid | 80% by volume. |
| Hydrofluoric acid (70%) | 6% by volume. |
| Orthophosphoric acid (85%) | 0.01% by volume. |
| Sulfite ion (provided by bubbling gaseous sulfur dioxide in the solution) | Saturation. |
| Water | Balance. |

The part is connected in such a manner that it will act as an anode with reference to a cathode, which is also in contact with the bath. An electric current having a current density of approximately 15 amperes per square foot of part descaled and with a voltage of approximately 6 volts, is passed through the solution. The temperature of the bath is maintained at room temperature. After a period of a few minutes (between about three and ten minutes), it will be noticed that the current drops to a level of less than 75% of its original value. This indicates that the scale has become loosened, and at this time the part should be removed from the bath. This lower current level may be as low as 5% of the initial value, although when the current drops to less than 75% of its initial level (as mentioned above), the part should be removed. The part is then rinsed in water, and in many instances, it is desirable to focus an air and water blast on the part to aid in loosening the small particles of scale which are still clinging to the part surface. Recycling to remove very stubborn scale is also effective. We have found that in this manner the part is readily descaled with very little metal removal, and the surface of the metal is bright and smooth.

The tests support the following conclusions. When more than 95% sulfuric acid is used the scale becomes very difficult to remove and the process is not satisfactory. At concentrations below 70% sulfuric acid, a slight amount of electropolishing begins around the edges of the part while the center of the part becomes somewhat rougher, and the descaling action slows down. However, we have found that the process still will provide satisfactory results in certain instances and for certain uses when the sulfuric acid concentration is as low as 60% by volume. With both the high (95%) and the low (60%) sulfuric acid concentration, a surface scum begins to form which is difficult to remove.

At concentrations above about 10% hydrofluoric acid (70%) there is a tendency to pit the part, but parts satisfactory for certain uses are provided by using a concentration up to 20% by volume. At concentrations below about 3% hydrofluoric acid (70%) the scale removal becomes more difficult but the process is still satisfactory down to a concentration of about 0.5% of hydrofluoric acid. As mentioned above in connection with the high and low concentrations of sulfuric acid, high and low hydrofluoric acid concentrations result in the formation of a rather tenacious surface scum.

The use of sufficient sulfite ion reduces the adherence of all surface scums, making the scum thinner and easier to rinse off.

In general, the solution action is rather insensitive to temperature. However, there is a sizeable loss of hydrofluoric acid and sulfite ion at high temperatures.

We have found that our solution has very great capacity with the equivalent of 500 square feet (or more) of surface being descaled per gallon of solution. The sludge, which consists principally of pieces of scale which have dropped off the parts and other contaminants, does not interfere with the operation as long as the part remains above the sludge level.

Other items of note include the desirability of maintaining a constant balance between water and sulfuric acid in order to keep the voltage constant; the fact that agitation is not necessary or even desirable with our solution; and as pointed out previously, the descaling action is supplemented and the current demand is automatically reduced as the scale is loosened.

It should also be pointed out that by the use of our process, and in particular as long as the concentration of orthophosphoric acid is less than 0.5% by volume, the metal removal from the surface part is extremely small.

Our tests show that current densities as low as 5 amperes per square foot of surface descaled are usable with an upper limit being approximately 600 amperes per square foot. While low voltages of around 4 to 8 volts are very satisfactory, the voltage may vary between about 1 volt and 15 volts. Also, the time periods during which the current is passed through the bath vary between 0.5 and 20 minutes.

Our invention operates not by dissolving the scale but by removing the loosened scale from the surface either by solution gassing or by water rinsing. It appears that frequently immersion into water after electrochemical action causes high stresses on the scale which become so great as to actually fragmentize it. This fragmentized reaction takes approximately one to three minutes and is easily observable. This fragmentizing action frequently eliminates the necessity or desirability of the aforementioned air and water blast.

Frequently we have found that a wetting agent is desirable in order to reduce the surface tension of the solution. Suitable wetting agents include alkyl aryl sulfonates such as dodecyl benzene sulfonate.

While the present invention has been shown in a few forms only, it will be obvious to those skilled in the art that it is not so limited but is susceptible of various changes and modifications without departing from the spirit and scope thereof.

We claim as our invention:

1. An acid aqueous bath for removing scale from heat treated metal members by electrochemical means, said bath including 60% to 95% by volume of sulfuric acid (100%), 0.5% to 20% by volume of hydrofluoric acid (70%), 0.001% by weight to saturation of sulfite ion, 0% to 0.5% by volume of orthophosphoric acid (85%), with the remainder being water.

2. An acid aqueous bath for removing scale from heat treated metal members by electrochemical means, said bath including hydrogen ion, sulfate ion in a concentration corresponding to that obtained in a solution containing from about 60% to about 95% by volume of sulfuric acid (100%), fluoride ion in a concentration corresponding to that obtained in a solution containing from about 0.5% to about 20% by volume of hydrofluoric acid (70%), sulfite ion in a concentration corresponding to that obtained in a solution containing from about 0.001% by weight to saturation of the solution, phosphate ion in a concentration corresponding to that obtained in a solution containing from 0% to 0.5% by volume of orthophosphoric acid (85%), with the remainder being water.

3. A process for removing scale from heat treated metal members, said process including the steps of treating said member in an acid aqueous bath including hydrogen ion, sulfate ion in a concentration corresponding to that obtained in a solution containing from about 60% to about 95% by volume of sulfuric acid (100%), fluoride ion in a concentration corresponding to that obtained in a solution containing from about 0.5% to about 20% by volume of hydrofluoric acid (70%), sulfite ion in a concentration corresponding to that obtained in a solution containing from about 0.001% by weight to saturation of the solution, phosphate ion in a concentration corresponding to that obtained in a solution containing from 0% to 0.5% by volume of orthophosphoric acid (85%), with the remainder being water, electrically connecting said member so that said member is anodic with respect to a cathode in contact with said bath, passing an electrical current of approximately 5 to 600 amperes per square foot through said bath between said cathode and said anode until the current drops rapidly to less than about 75% of its initial value, disconnecting said electrical current, removing said member from said acid aqueous bath, and rinsing said member to remove all portions of said bath.

4. A process for removing scale from heat treated metal members, said process including the steps of treating said member in an acid aqueous bath including hydrogen ion, sulfate ion in a concentration corresponding to that obtained in a solution containing from about 60% to about 95% by volume of sulfuric acid (100%), fluoride ion in an concentration corresponding to that obtained in a solution containing from about 0.5% to about 20% by volume of hydrofluoric acid (70%), sulfite ion in a concentration corresponding to that obtained in a solution containing from about 0.001% by weight to saturation of the solution, phosphate ion in a concentration corresponding to that obtained in a solution containing from 0% to 0.5% by volume of orthophosphoric acid (85%), with the remainder being water, electrically connecting said member so that said member is anodic with respect to a cathode in contact with said bath, passing an electrical current of approximately 5 to 600 amperes per square foot through said bath between said cathode and said anode until the current drops rapidly to less than about 75% of its initial value, disconnecting said electrical current, removing said member from said acid aqueous bath, rinsing said member to remove all portions of said bath and repeating said steps.

5. A process for removing scale from heat treated metal members, said process including the steps of treating said member in an acid aqueous bath including hydrogen ion, sulfate ion in a concentration corresponding to that obtained in a solution containing from about 60% to about 95% by volume of sulfuric acid (100%), fluoride ion in a concentration corresponding to that obtained in a solution containing from about 0.5% to about 20% by volume of hydrofluoric acid (70%), sulfite ion in a concentration corresponding to that obtained in a solution containing from about 0.001% by weight to saturation of the solution, phosphate ion in a concentration corresponding to that obtained in a solution containing from 0% to 0.5% by volume of orthophosphoric acid (85%), with the remainder being water, electrically connecting said member so that said member is anodic with respect to a cathode in contact with said bath, passing an electrical current through said bath between said cathode and said anode for a period between 0.5 and 20 minutes, maintaining said current density between 5 amperes per square foot and 600 amperes per square foot, maintaining the voltage between 1 volt and 15 volts, continuing passing said electrical current until the current drops rapidly to less than about 75% of its initial value, disconnecting said electrical current, removing said member from said acid aqueous bath, rinsing said member to remove all portions of said bath and repeating said steps.

References Cited in the file of this patent

UNITED STATES PATENTS

| | | |
|---|---|---|
| 1,324,317 | Marino | Dec. 9, 1919 |
| 1,326,280 | Man | Dec. 30, 1919 |
| 1,582,974 | Garbarino | May 4, 1926 |
| 1,919,624 | Dunn et al. | July 25, 1933 |
| 2,115,005 | Blaut et al. | Apr. 26, 1938 |
| 2,228,026 | Abrahams | Jan. 7, 1941 |
| 2,408,424 | Healy et al. | Oct. 1, 1946 |
| 2,572,576 | Stybel | Oct. 23, 1951 |

FOREIGN PATENTS

| | | |
|---|---|---|
| 218,220 | Australia | Oct. 15, 1958 |